US011941707B2

(12) United States Patent
Nassar et al.

(10) Patent No.: US 11,941,707 B2
(45) Date of Patent: *Mar. 26, 2024

(54) DETERMINING AN EFFECT OF A MESSAGE ON A PERSONAL BRAND BASED ON FUTURE GOALS

(71) Applicant: International Business Machines Corporation, Armonk, NY (US)

(72) Inventors: Nader Nassar, Yorktown Heights, NY (US); Santosh S. Borse, Westchester, NY (US); Chris Dotson, Lexington, KY (US); Annette Riffe, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 938 days.

This patent is subject to a terminal disclaimer.

(21) Appl. No.: 15/936,994

(22) Filed: Mar. 27, 2018

(65) Prior Publication Data

US 2019/0304034 A1 Oct. 3, 2019

(51) Int. Cl.
*G06Q 50/00* (2012.01)
*G06N 5/02* (2023.01)
*H04L 51/52* (2022.01)

(52) U.S. Cl.
CPC .............. *G06Q 50/01* (2013.01); *G06N 5/02* (2013.01); *H04L 51/52* (2022.05)

(58) Field of Classification Search
CPC ........ G06Q 50/00; G06Q 30/00; G06Q 10/00; G06N 5/02; H04L 51/32
See application file for complete search history.

(56) References Cited

U.S. PATENT DOCUMENTS 9,313,284 B2 4/2016 Anglin et al.
9,367,537 B2 6/2016 Dua et al.
(Continued)

FOREIGN PATENT DOCUMENTS

CN 102279890 A 12/2011
CN 105144227 A 12/2015
(Continued)

OTHER PUBLICATIONS

Kontopoulos, Ontology based sentiment analysis of twitter posts, 2013 (Year: 2013).*
(Continued)

*Primary Examiner* — Sangeeta Bahl
(74) *Attorney, Agent, or Firm* — KONRAD RAYNES DAVDA & VICTOR LLP; Janaki K. Davda

(57) ABSTRACT

Provided are techniques for determining an effect of a message on a personal brand based on future goals. A message is received from an entity for a social media platform. Additional messages related to the message are identified. A reaction sentiment trend is determined for each topic of the additional messages for a period of time. An effect the message has on a personal brand of the entity in future is predicted based on future goals of the entity and based on the reaction sentiment trend for each topic. An indication of whether the message is aligned with the future goals based on the predicted effect is provided. In response to the message being aligned with the future goals, the message is posted to the social media platform. In response to the message not being aligned with the future goals, one or more suggestions to modify the message are provided.

10 Claims, 12 Drawing Sheets

(56) References Cited

U.S. PATENT DOCUMENTS

| | | | |
|---|---|---|---|
| 9,563,693 B2* | 2/2017 | Zhang | G06F 16/345 |
| 9,585,239 B2* | 2/2017 | Nall | H05K 3/32 |
| 9,646,096 B2 | 5/2017 | Tsai et al. | |
| 9,852,239 B2 | 12/2017 | Natarajan et al. | |
| 10,614,077 B2 | 4/2020 | Lange et al. | |
| 10,614,471 B2 | 4/2020 | Boss et al. | |
| 2007/0100688 A1 | 5/2007 | Book | |
| 2008/0046823 A1 | 2/2008 | Korbin | |
| 2009/0112719 A1 | 4/2009 | Bhave et al. | |
| 2010/0223581 A1 | 9/2010 | Manolescu et al. | |
| 2013/0185106 A1 | 7/2013 | Donatone et al. | |
| 2014/0088944 A1 | 3/2014 | Natarajan et al. | |
| 2014/0278356 A1 | 9/2014 | Anglin et al. | |
| 2014/0324970 A1 | 10/2014 | Peshkam | |
| 2015/0170228 A1 | 6/2015 | Wheeler et al. | |
| 2015/0254785 A1 | 9/2015 | Yang et al. | |
| 2015/0278175 A1 | 10/2015 | Dua et al. | |
| 2015/0278196 A1 | 10/2015 | Dua et al. | |
| 2015/0294376 A1 | 10/2015 | Christiansen | |
| 2015/0312200 A1* | 10/2015 | Brav | G06F 40/253 709/206 |
| 2016/0055235 A1 | 2/2016 | Zhang et al. | |
| 2016/0092997 A1 | 3/2016 | Shen et al. | |
| 2016/0132915 A1 | 5/2016 | Puranik et al. | |
| 2016/0352805 A1 | 12/2016 | Seida | |
| 2017/0061497 A1* | 3/2017 | Akkiraju | G06Q 50/01 |
| 2017/0140040 A1 | 5/2017 | Gottemukkala et al. | |
| 2017/0180197 A1 | 6/2017 | Boldrin et al. | |
| 2017/0286429 A1 | 10/2017 | Lange et al. | |
| 2017/0323312 A1* | 11/2017 | Penumaka | G06Q 30/0201 |
| 2018/0189807 A1 | 7/2018 | Boss et al. | |
| 2019/0304036 A1 | 10/2019 | Nassar et al. | |

FOREIGN PATENT DOCUMENTS

| | | |
|---|---|---|
| CN | 105359181 A | 2/2016 |
| CN | 105468780 A | 4/2016 |
| CN | 105830118 A | 8/2016 |
| CN | 107194721 A | 9/2017 |
| CN | 106021269 B | 6/2019 |
| EP | 2953084 | 9/2015 |

OTHER PUBLICATIONS

Hu, Exploiting social relations for sentiment analysis in microblogging (Year: 2013).*

E. Duffy et al., "Facebook for Academics": The Convergence of Self-Branding and Social Media Logic on Academia.edu. dated Jan. Mar. 2017, Social Media + Society, Total 11 pages.

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing", dated Sep. 2011, Recommendations of the National Institute of Standards and Technology, Total 7 pages.

US Patent Application, dated Jun. 18, 2019, for U.S. Appl. No. 16/444,961 (54.150C1), filed Jun. 18, 2019, by Nader Nassar et al., Total 41 pages.

Preliminary Amendment, dated Jun. 18, 2019, for U.S. Appl. No. 16/444,961 (54.150C1), filed Jun. 18, 2019, by Nader Nassar et al., Total 6 pages.

List of Patents and Applications Treated as Related, dated Jun. 18, 2019, total 2 pages.

Office Action1, dated Sep. 2, 2020, for U.S. Appl. No. 16/444,961 (54.150C1), filed Jun. 18, 2019, by Nader Nassar et al., Total 24 pages.

Response to Office Action1, dated Dec. 2, 2020, for U.S. Appl. No. 16/444,961 (54.150C1), filed Jun. 18, 2019, by Nader Nassar et al., Total 14 pages.

A.Ortigosa et al., "Sentiment Analysis in Facebook and its Application to E-Learning" dated Aug. 7, 2013, Total 15 pages.

Final Office Action1, dated Mar. 17, 2021, for U.S. Appl. No. 16/444,961 (54.150C1), filed Jun. 18, 2019, Total 21 pages.

Response to Final Office Action, dated Jun. 16, 2021, for U.S. Appl. No. 16/444,961 (54.150C1), filed Jun. 18, 2019, Total 11 pages.

Office Action3, dated Jul. 21, 2021, for U.S. Appl. No. 16/444,961 (54.150C1), filed Jun. 18, 2019, Total 22 pages.

Response to Office Action3, dated Oct. 20, 2021, for U.S. Appl. No. 16/444,961 (54.150C1), filed Jun. 18, 2019, Total 13 pages.

M. Meire et al., "The Added Value of Auxiliary Data in Sentiment Analysis of Facebook Posts" dated 2016, Decision Support Systems, Total 15 pages.

L. Lu, "Integrated Marketing Communication Strategy for Personal Branding of Public Figures", Journal of News Research, vol. 8 No. 4, Feb. 2017, 5 pp.

Chinese Office Action dated Dec. 1, 2022, 17 pp., for Application No. 201910236659.X.

A.Dennett, et al., "Tweet Ripple: Understanding Your Twitter Audience and the Impact of your Tweets," IEEE Computer Society, 2nd IEEE International Conference on Collaboration and Internet Computing, Pittsburgh, PA, Nov. 1-3, 2016, 10 pp.

Final Office Action dated Jan. 28, 2022, pp. 23, for (54.150C1).

Response dated Mar. 24, 2022, 14 pp., to Final Office Action for (54.150C1).

Office Action dated Jun. 7, 2022, pp. 15, for (54.150C1).

Response dated Sep. 6, 2022, pp. 8, to Final Office Action, pp. 23, for (54.150C1).

Notice of Allowance dated Oct. 12, 2022, 9 pp., for U.S. Appl. No. 16/444,861, (54.150C1).

Notice of Allowance dated Feb. 1, 2023, 14pp., for U.S. Appl. No. 16/444,861, (54.150C1).

Chinese Notice of Allowance dated May 23, 2023, 5 pp., for Application No. 201910236659.X.

* cited by examiner

DETERMINING AN EFFECT OF A MESSAGE ON A PERSONAL BRAND BASED ON FUTURE GOALS

FIELD

Embodiments of the invention relate to determining an effect of a message (e.g., a social media post) on a personal brand based on future goals before the message is submitted to a social media platform. That is, embodiments relate to incremental scoring of personal branding based on social media postings. Thus, embodiments determine an effect of a current message on future goals.

BACKGROUND

A personal brand may be described as a collection of information about a person (such as educational background, experience, and areas of interest) that combine to create an overall impression of that person. The personal brand may also include what others think about the person.

A user may have social media interactions that may harm the user's future goals, such as growing a business, getting a job, or being admitted to a school. High-profile or wealthy individuals may have some limited, manual ways to accomplish this. For example, they may use an agent or a public relations firm to fix their personal brand based on a social media post that has already been sent.

SUMMARY

In accordance with embodiments, a computer-implemented method is provided for determining an effect of a message on a personal brand based on future goals. The computer-implemented method comprises: receiving, with a processor of a computer, a message from an entity for a social media platform; identifying additional messages related to the message; determining a reaction sentiment trend for each topic of the additional messages for a period of time; predicting an effect the message has on a personal brand of the entity in future based on future goals of the entity and based on the reaction sentiment trend for each topic; providing an indication of whether the message is aligned with the future goals based on the predicted effect; in response to the message being aligned with the future goals, posting the message to the social media platform; and, in response to the message not being aligned with the future goals, providing one or more suggestions to modify the message.

In accordance with other embodiments, a computer program product is provided for determining an effect of a message on a personal brand based on future goals. The computer program product comprising a computer readable storage medium having program code embodied therewith, the program code executable by at least one processor to perform operations comprising: receiving a message from an entity for a social media platform; identifying additional messages related to the message; determining a reaction sentiment trend for each topic of the additional messages for a period of time; predicting an effect the message has on a personal brand of the entity in future based on future goals of the entity and based on the reaction sentiment trend for each topic; providing an indication of whether the message is aligned with the future goals based on the predicted effect; in response to the message being aligned with the future goals, posting the message to the social media platform; and, in response to the message not being aligned with the future goals, providing one or more suggestions to modify the message.

In yet other embodiments, a computer system is provided for determining an effect of a message on a personal brand based on future goals. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving a message from an entity for a social media platform; identifying additional messages related to the message; determining a reaction sentiment trend for each topic of the additional messages for a period of time; predicting an effect the message has on a personal brand of the entity in future based on future goals of the entity and based on the reaction sentiment trend for each topic; providing an indication of whether the message is aligned with the future goals based on the predicted effect; in response to the message being aligned with the future goals, posting the message to the social media platform; and, in response to the message not being aligned with the future goals, providing one or more suggestions to modify the message.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
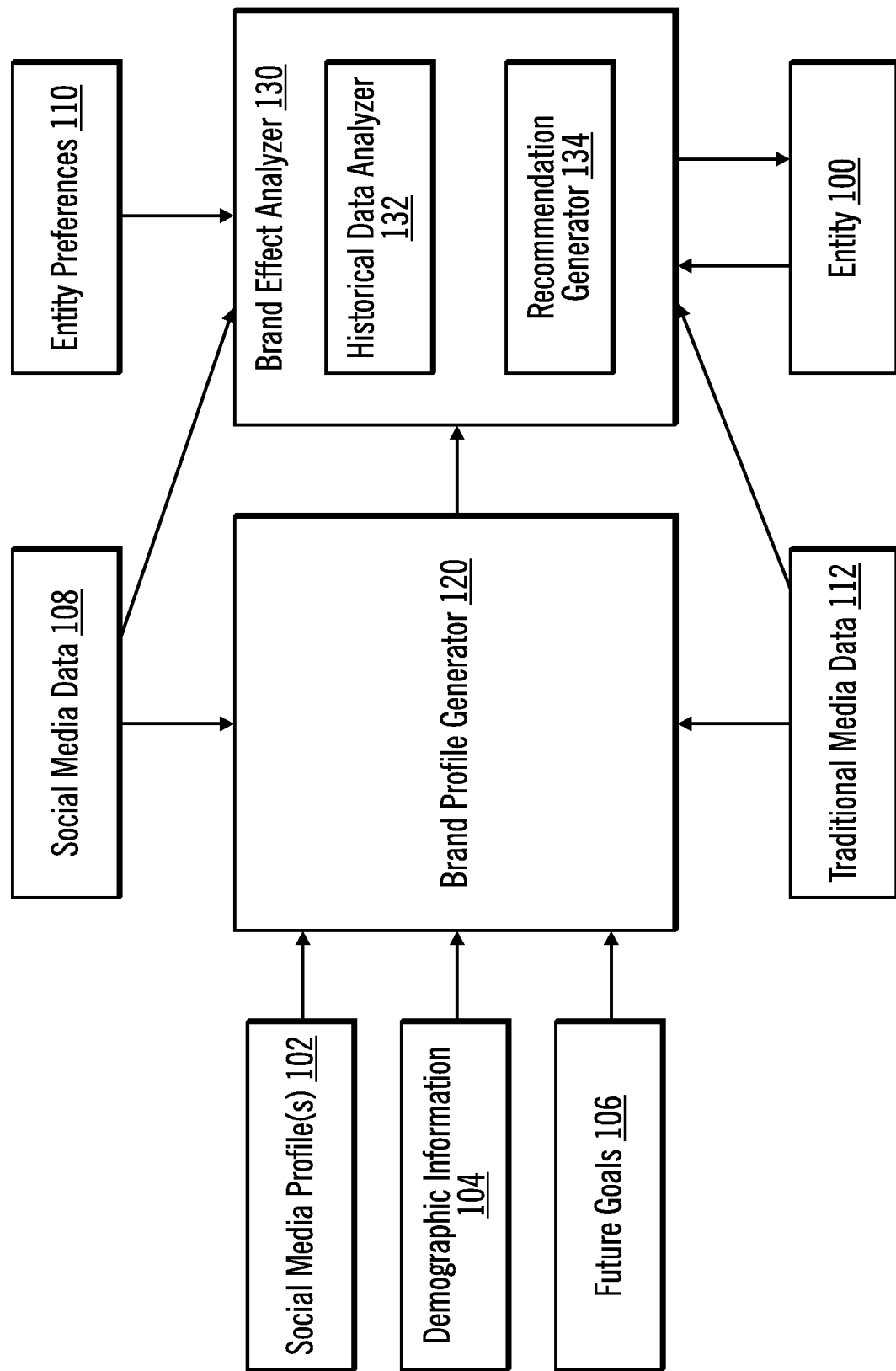
FIG. 1 illustrates, in a block diagram, a computing environment in accordance with certain embodiments.

FIG. 1 illustrates, in a block diagram, a computing environment in accordance with certain embodiments. An entity 100 provides a message to a brand effect analyzer 130. The entity may be a human individual (user), a group, an association, a corporation, etc. The message may be a social media post or a comment submitted for a social media post. The content of the message may include: text, an image, a video, links or any combination of these types of content.

Also, the brand effect analyzer 130 receives input from social media data 108, entity preferences 110 of the entity 100, traditional media data, and a brand profile from a brand profile generator 120. The brand effect analyzer 130 includes a historical data analyzer 132 and a recommendations generator 134.

The historical data analyzer 132 analyzes the effect that past\historical messages have on an entity's personal brand, while the recommendations generator 134 uses data analysis to understand what effect a similar type of content had on entities (e.g., authors) of similar demography or similar future goals to provide recommendations on whether to submit the message or modify the message.

The brand profile generator 120 receives input from one or more social media profiles 102, demographic information 104, future goals 106, social media data 108, and traditional media data 112 (e.g., news data) and outputs a brand profile. The brand profile describes an impression of the entity that the entity wishes to convey to a community. For example, the brand profile for the entity includes future goals and aspirations of the entity, a current personal brand of the entity, opinions expressed by others about the entity, associations of the entity with groups, a list of subjects that the entity has expressed opinions about, associations of the entity with institutions, etc. If an entity is a new social media entity, embodiments may be primed by taking common attributes from another entity or from a group of entities having a similar demography. With embodiments, the brand profile generator 120 continuously updates the entity's brand profile at regular intervals to accommodate changes in data and future goals. The brand profile generator 120 understands a current personal brand of the entity by using various data sources such as: one or more social media profiles 102, demographic information 104 of the entity, future goals 106 of the entity, social media data 108, and traditional media content generated about the entity.

Any of the one or more social media profiles 102, demographic information 104, future goals 106, social media data 108, entity preferences 110, and traditional media data 112 may change, which may change the brand profile and change the effect of a message on a personal brand.

The social media profiles 102 may be described as information about the entity 100 using social media platforms, such as a chat application, a blogging application, a social networking application, a feeds application, a wikis application, etc. The demographic information 104 includes statistical information. The future goals 106 represent aspirations of the entity 100. With embodiments, the future goals 106 include any combination of: personal goals, professional goals, particular positions to be kept consistent, volatile topics to avoid, and opinions to attract favorable attention. The social media data 108 includes data generated by the entity (e.g., posts, comments, and endorsements) and data generated about the entity.

With embodiments, the entity provides the content of a message to the brand effect analyzer 130. The message is submitted to the brand effect analyzer 130 before being submitted (e.g., posted) to a social media platform. This submission of the message to the brand effect analyzer 130 may be done directly to the brand effect analyzer 130 or by integrating brand effect analyzer 130 with the social media platform, message posting tool or social media site.

The brand effect analyzer 130 provides the entity 100 with an effect (i.e., impact) of the message now and in future. That is, messages made currently may affect a future personal brand. That is, the messages an entity posts currently may be held against that entity in the future. Also, even though the entity's opinions may change, messages posted on the social media platform remain publicly available for a long period of time, and so these messages may impact the future personal brand of the entity.

With embodiments, the brand effect analyzer 130 analyzes past social media interactions through messages, along with demographic information and public sentiment information, to rate how "acceptable" a proposed social media interaction is expected to be based on stated goals of the entity and how that message will impact the personal brand.

In certain embodiments, the brand effect analyzer 130 may be an application that filters messages before the messages are posted to the social media platform. With other embodiments, the brand effect analyzer 130 may be an add-on to a specific social media platform that may be enabled by the entity.

As a first example, an entity logs in to a social media platform and types in a first post about a news article that the entity just read, entering an opinion about some aspect of the article. Embodiments analyze the first post and compare that first post to previously expressed opinions and statements that the entity has made on the topic and similar topics. Based on the results of the analysis, embodiments advise the entity that this opinion may impact the personal brand negatively because it contradicts a post that the entity made in a previous, second message posting on a similar, but unrelated article. Based on this, the entity may decide not to submit the message to the social media platform.

As a second example, the entity is a young person just starting out on social media. The entity has a goal to attend a highly ranked college and is aware that the college will look at social media interactions when considering an application to the college. The entity enters a message to a social media platform, but embodiments have no previous messages to compare this entry to. Therefore, embodiments compare the message to those of a peer group. Based on the comparison, embodiments advise the entity that the message will not have any effect on the goal of getting admission in the college. Based on this, the entity may decide to submit the message to the social media platform.

Initially the brand effect analyzer 130 compares proposed messages to those the entity has identified as peers. Peers may be identified as: living in the same geographic area, holding similar educational levels, having projected similar future goals and aspirations, etc.

With embodiments, if the entity is new to using social media platforms (and so there are no or few previously submitted messages), embodiments may be primed by comparing the messages of similar demographics to the entity and determining whether the reactions to those messages aligned with the future goals of the entity or not. If the entity is an established entity (having previously submitted messages), embodiments farm existing messages and, after analyzing them to see if they are consistent with the future goals, either advise the entity of outlying positions or may include those outliers as special cases, depending on how the entity wants to react.

Eventually, the brand effect analyzer 130 learns enough about the entity and the demographic pool of the entity to be able to advise the entity before the entity submits a message as to whether the message will advance or detract from the future goals of the entity.

The brand effect analyzer 130 receives a message from an entity before the entity submits the message to a social media platform. The brand effect analyzer 130 analyzes the message content by extracting topics of the post. With embodiments, there may be one or more topics in a given message, and the topic represents what the message is about or what the message is related to. Then, the brand effect analyzer 130 extracts the sentiment\opinion\tone expressed by the entity about those topics. The brand effect analyzer 130 compares that by understand the what effect a similar type of content with similar type of opinion had on entities of similar demography or on entities having similar goals and aspirations. After analysis completion, the brand effect analyzer 130 provides one or more recommendations, along with an example, to the entity.

The following are example of recommendations that the brand effect analyzer 130 may provide:
  The following message is in contradiction with your previous message, which may impact your goal of being a reliable person.
  The following message about may offend your followers (as most of them as expressed the opposite opinion about the topic).

Figure 2:
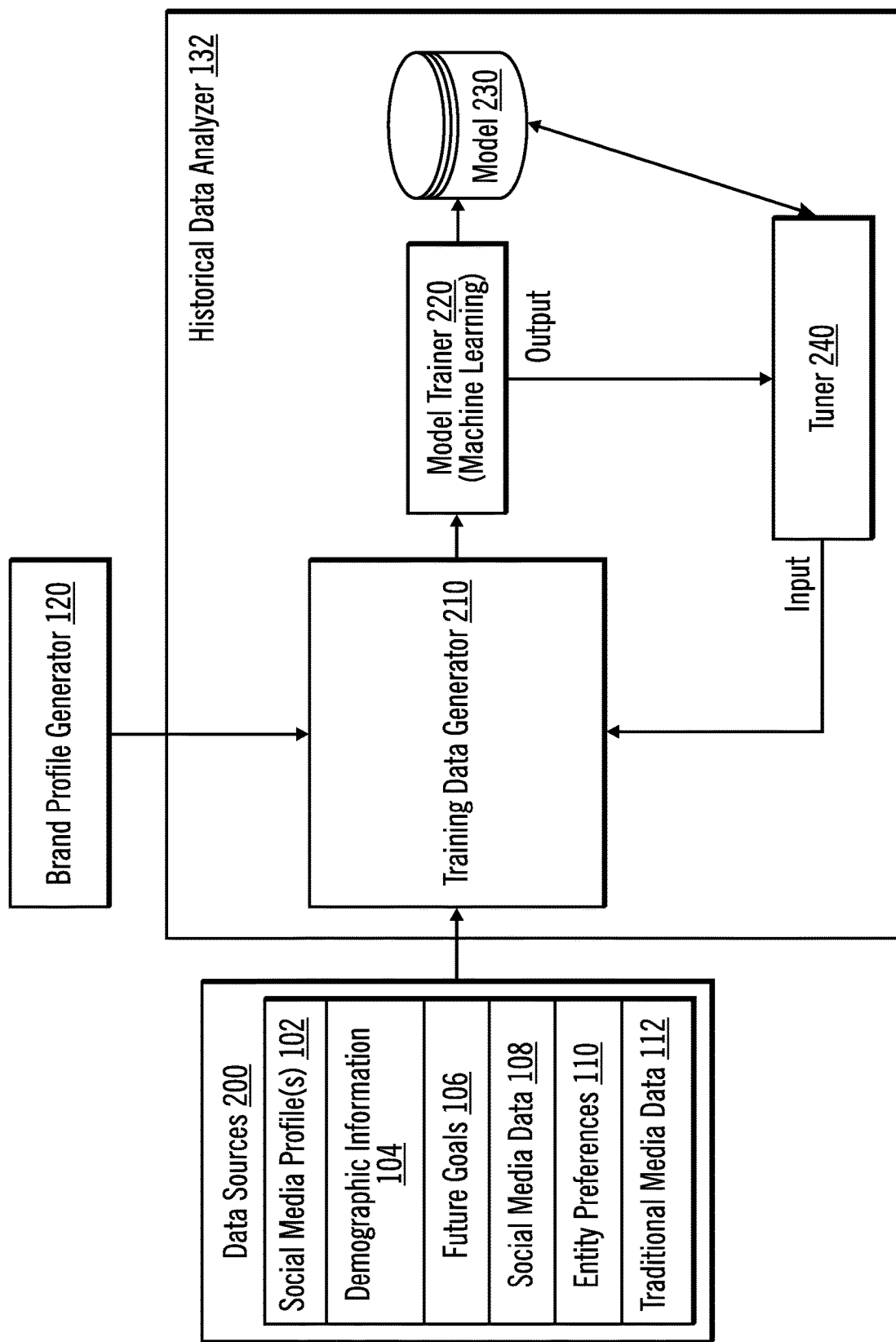
FIG. 2 illustrates, in a block diagram, further details of a historical data analyzer in accordance with certain embodiments.

FIG. 2 illustrates, in a block diagram, further details of a historical data analyzer 132 in accordance with certain embodiments. In FIG. 2, the historical data analyzer 132 includes a training data generator 210, a model trainer 220, a model 230, and a tuner 240. A model 230 may be described as a data representation of the information gathered by the training data generator 210.

The historical data analyzer 132 uses machine learning to learn the effect a message may have on an entity's personal brand. With embodiments, the historical data analyzer 132 reads every message made so far and continuously updates analysis for every new message and improves with time. Thus, the brand effect analyzer 130 uses machine learning, which analyzed all the historical data to analyze every message and effect of each of these messages on the personal brand of the entity.

The training data generator 210 may use the following set of techniques to prepare the training data: text analytics, data cleanup, Extract, Transform, Load (ETL) processing, named entity recognition and classification, Natural Language Processing (NLP), personality insights, sentiment analysis, visual recognition, and tone analysis. The training data generator 210 receives data from data sources 200 of: one or more social media profiles 102, demographic information 104, future goals 106, social media data 108, and traditional media data 112. With embodiments, the brand profile generator 120 continuously updates the entity's brand profile at regular intervals to accommodate changes in data and future goals. The brand profile generator 120 understands a current personal brand of the entity by using various data sources such as: one or more social media profiles 102, demographic information 104 of the entity, future goals 106 of the entity, social media data 108, and traditional media content generated about the entity. The training data generator 210 generates training data for the model trainer 220. The model trainer 220 performs machine learning to create a model 230. A tuner 240 is used to tune the model based on heuristics and configuration settings that determine how much an event impacts the resulting model. For example, reactions to a specific type of incident that occurred more than 10 years ago would have less of an effect on the model than reactions to similar events that happened within the past year. The tuner 240 outputs suggested changes to the training data based on the effect of the initial data on the model, which is input to the training data generator 210.

With embodiments, the output of the training data generator 210 is stored in a database with fields. Examples of the fields include: message content, message topic, sentiment, type of reaction, message tone, content reach, entity's demography attributes, reactors demography attributes, effect then, effect now, and current personal brand value. This output is sent to the model trainer 220, which uses machine learning to train the model 230, while the tuner 240 uses the output sent via the model trainer 220 to tune the model by adjusting the contents of the model to enable the brand effect analyzer 130 to better predict the effect of a given message on the personal brand of an entity.

The trained model 230 is used by the recommendation generator 134. With embodiments, the model trainer 220 is capable of making an accurate prediction of the effect of posting on the personal brand once there is sufficient learning from past data.

Figure 3:
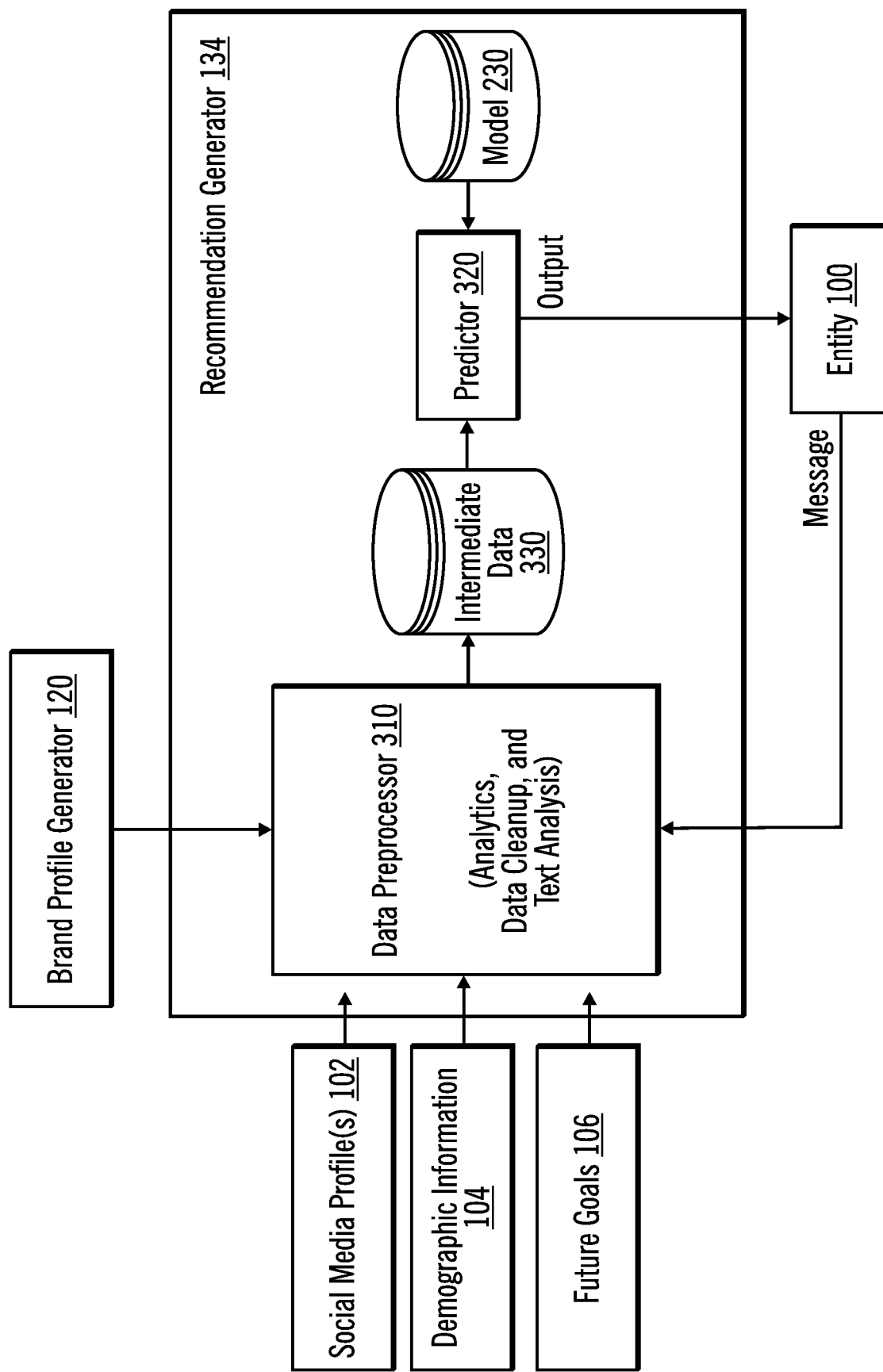
FIG. 3 illustrates, in a block diagram, further details of a recommendations generator in accordance with certain embodiments.

FIG. 3 illustrates, in a block diagram, further details of a recommendations generator 134 in accordance with certain embodiments. The recommendations generator 134 includes a data preprocessor 310 and a predictor 320.

The recommendations generator 134 is used by the entity to submit a message (e.g., social media post content). The entity may submit the message to the recommendations generator 134 directly or as part of a workflow in which the recommendations generator 134 intercepts the message. For example, with embodiments, an entity may interact with the recommendation generator 134 directly and input, "If I say X, will the impact on my personal brand be positive or negative?". As another example, with embodiments, the entity may have this be a filter on a social media platform in which the entity hits "post" and the recommendation generator 134 says, "Maybe you ought to think twice about posting this" before posting the message.

In the direct submission scenario, the entity writes the text of the message as input directly to the recommendations generator 134, without using a particular social media platform. The recommendations generator 134 evaluates the message's potential/effect and provides a recommendation. Then, the entity may determine whether or not to submit the message via the social media platform.

In the interception scenario, the entity writes the message to a social media account. The recommendations generator 134 intercepts the message and evaluates the message before the message is displayed. If the message is determined to have a negative effect on the entity's personal brand, the recommendations generator 134 alerts the entity, who may then choose to cancel the submission of the message. If the message has a positive or neutral effect, the recommendations generator 134 allows the message to continue to the social media platform unimpeded.

With embodiments, an entity 100 provides a message to the data preprocessor 310 (of the recommendation generator 134 of the brand effect analyzer 130). The data preprocessor 310 also receives input from social media profiles 102, demographic information 104, and future goals 106. The data preprocessor 310 also receives a brand profile for the entity from the brand profile generator 120.

The data preprocessor 310 generates an intermediate data 330 by performing analytics, data cleanup, and text analysis on the message, the social media profiles, the demographic information, the future goals, and the brand profile. The data preprocessor 310 sends the intermediate data 330 to the predictor 320. In addition, the predictor 320 of the recommendation generator 134 uses the model 230 (i.e., a machine learning model) generated by the historical data analyzer 132 to predict the effect of current content on an entity's personal brand.

The predictor 320 predicts an effect on the brand profile of the entity and provides a predicted effect of the message on the personal brand of the entity now and in the future. Moreover, the predicator 140 also provides an indication of whether the message contradicts previous messages for posting or comments made by the entity.

Figure 4:
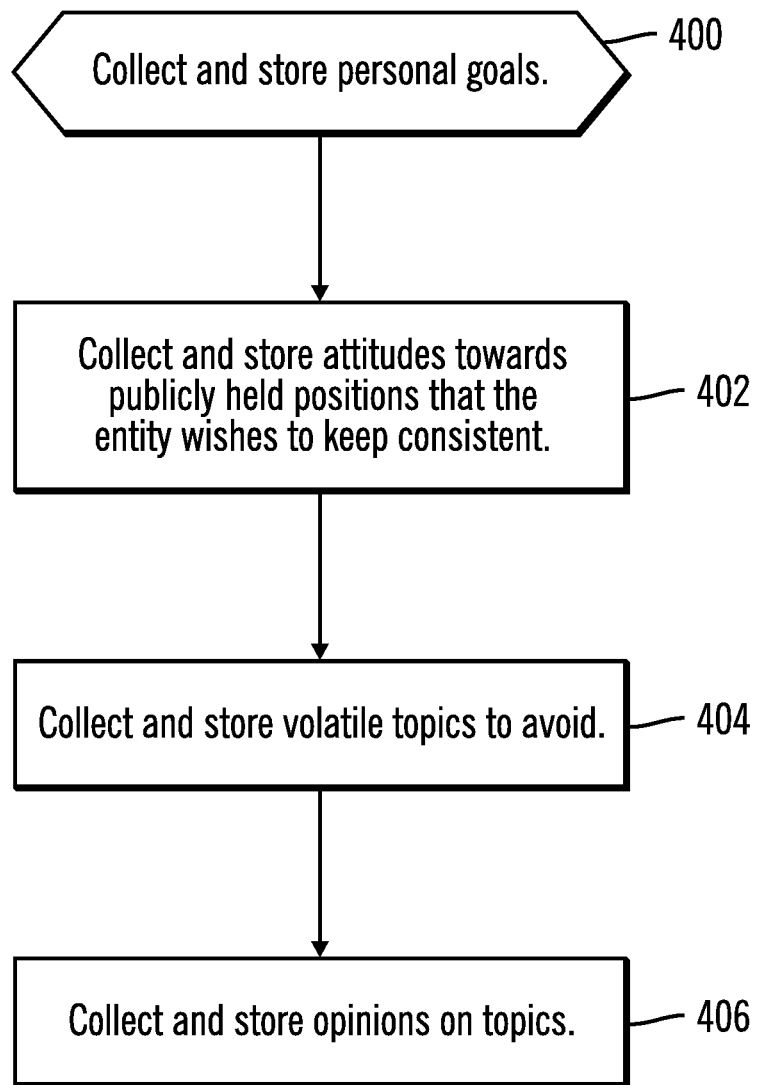
FIG. 4 illustrates, in a flow chart, operations for collecting data for future goals at initialization in accordance with certain embodiments.

FIG. 4 illustrates, in a flow chart, operations for collecting data for future goals at initialization in accordance with certain embodiments. Control begins at block 400 with the brand profile generator 120 collecting and storing personal and professional goals for the future. In block 402, the brand profile generator 120 collects and stores attitudes toward publicly held positions that the entity wishes to keep consistent. In block 404, the brand profile generator 120 collects and stores volatile topics to avoid (i.e., volatile topics that may cause the entity to become a lightning rod for negative attention). In block 406, the brand profile generator 120 collects and stores opinions on topics (i.e., opinions that may bring the entity favorable attention from a subset of the population that the entity is hoping to attract). This information may be collected via a Graphical User Interface (GUI) provided by embodiments.

Figure 5:
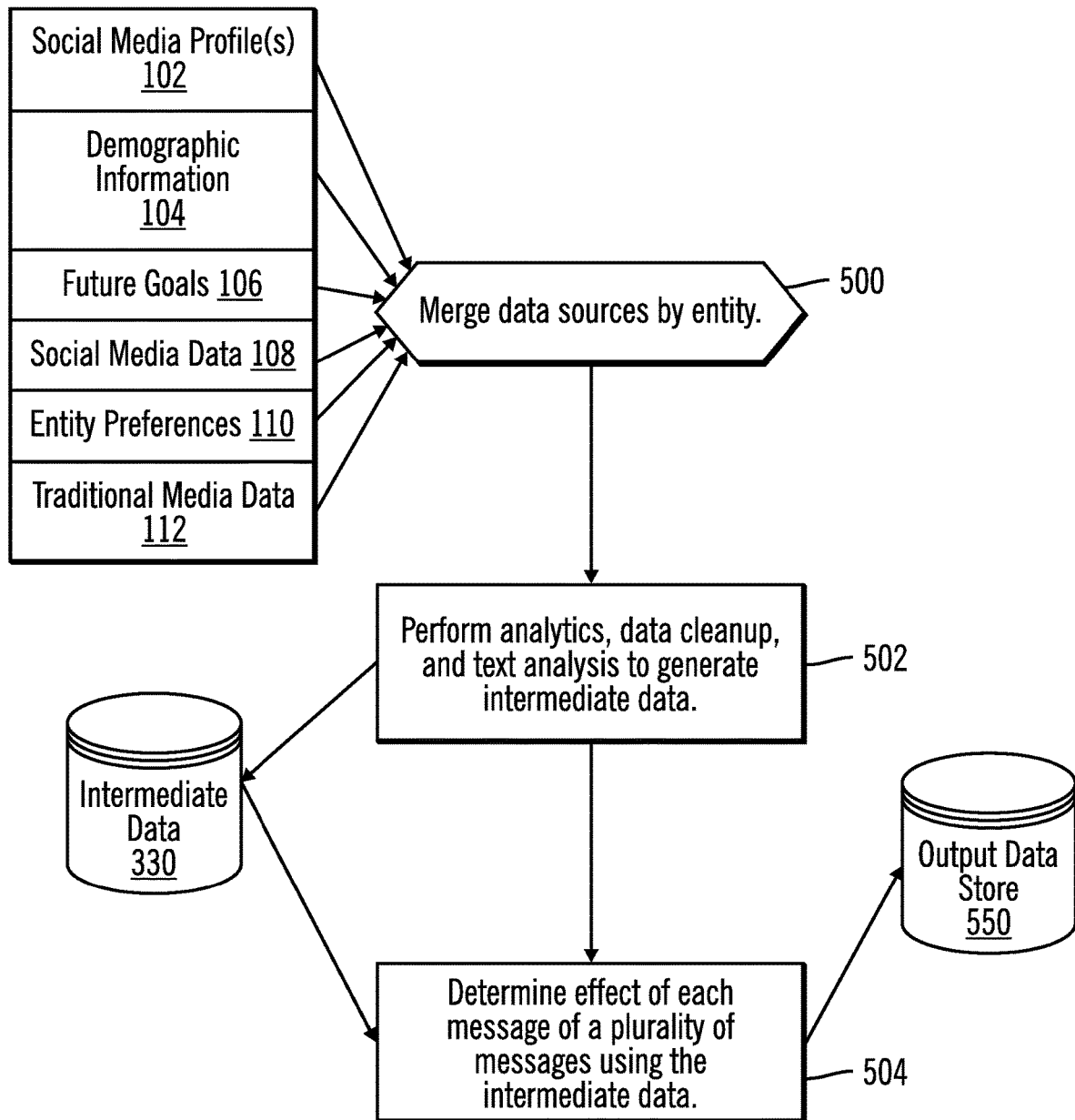
FIG. 5 illustrates, in a flow chart, operations for processing data in accordance with certain embodiments.

FIG. 5 illustrates, in a flow chart, operations for processing data in accordance with certain embodiments. Control begins at block 500 with the brand effect analyzer 130 merging data sources by entity. In block 502, the brand effect analyzer 130 (i.e., performs data cleanup and data enrichment) to generate the intermediate data 330. In block 504, the brand effect analyzer 130 determines an effect of each message of a plurality of messages using the intermediate data and generates output data to tune the model.

Figure 6A:
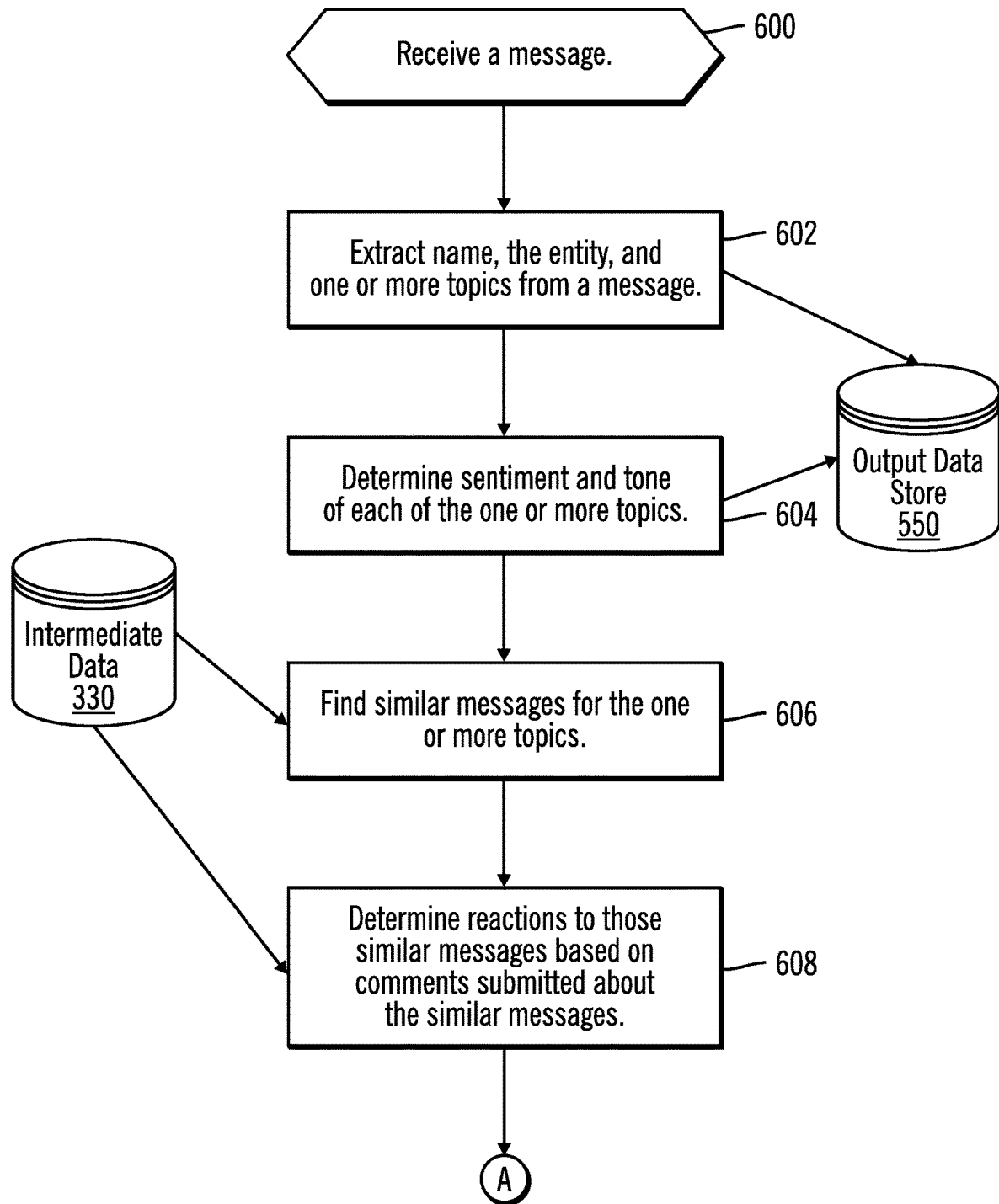
FIGS. 6A and 6B illustrate, in a flow chart, operations for determining an effect of a message on a personal brand in accordance with certain embodiments.
Figure 6B:
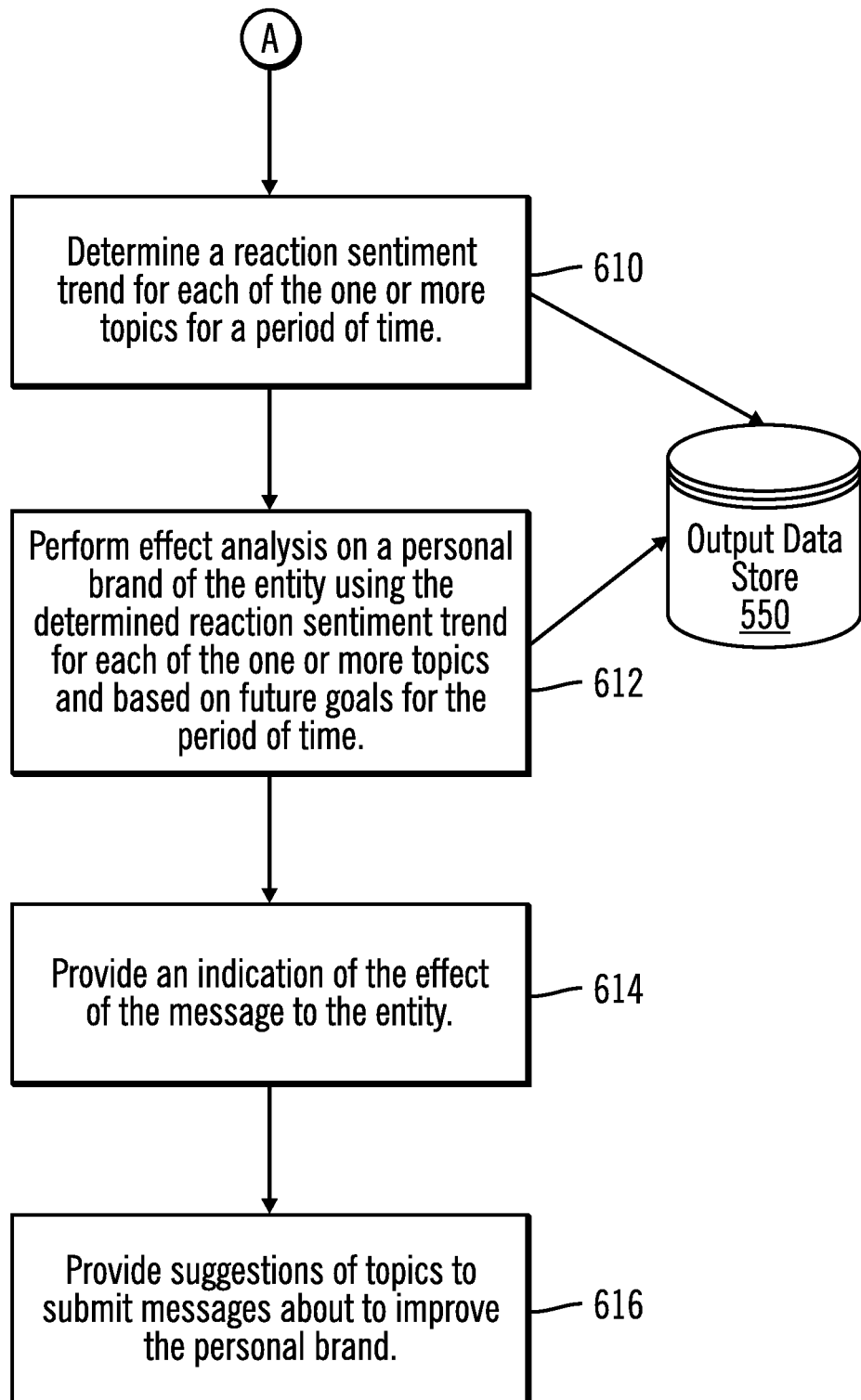

FIGS. 6A and 6B illustrate, in a flow chart, operations for determining an effect of a message on a personal brand in accordance with certain embodiments. Control begins at block 600 with the brand effect analyzer 130 receiving a message. With embodiments, the message is one that has not been posted yet. In other embodiments, the message is one that has been posted. In either case, the brand effect analyzer 130 provides suggestions of topics for the entity to post messages about.

In block 602, the brand effect analyzer 130 extracts a name, the entity, and one or more topics from a message. In block 604, the brand effect analyzer 130 determines a sentiment and tone of each of the one or more topics. Sentiment indicates how an entity feels about something (e.g., positive, negative or neutral), while tone indicates a style of expression (e.g., aggressive, empathetic, neutral, etc.). In block 606, the brand effect analyzer 130 finds similar messages for the one or more topics. In block 608, the brand effect analyzer 130 determines reactions to those similar messages based on comments submitted (e.g., posted) about the similar messages. From block 608 (FIG. 6A), processing continues to block 610 (FIG. 6B).

In block 610, the brand effect analyzer 130 determines a reaction sentiment trend for each of the one or more topics for a period of time. In certain embodiments, for a message that has been posted, the period of time may be from a time of that the message was posted to a current time. In other embodiments, the period of time may be set by the entity, set to a default period, etc. With embodiments the processing of block 610 may be done at regular intervals for messages that have been posted and may be used to generate time series data.

In block 612, the brand effect analyzer 130 performs effect analysis on a brand of the entity using the determined reaction sentiment trend for each of the one or more topics and based on future goals for the period of time. In certain embodiments, for a message that has been posted, the period of time may be from a time of that the message was posted to a current time. In other embodiments, the period of time may be set by the entity, set to a default period, etc. With embodiments the processing of block 612 may be done at regular intervals for messages that have been posted and may be used to generate time series data.

In block 614, the brand effect analyzer 130 provides an indication of the effect of the message to the entity. In block 616, the brand effect analyzer 130 provides suggestions of topics to submit messages about to improve the brand.

Figure 7A:
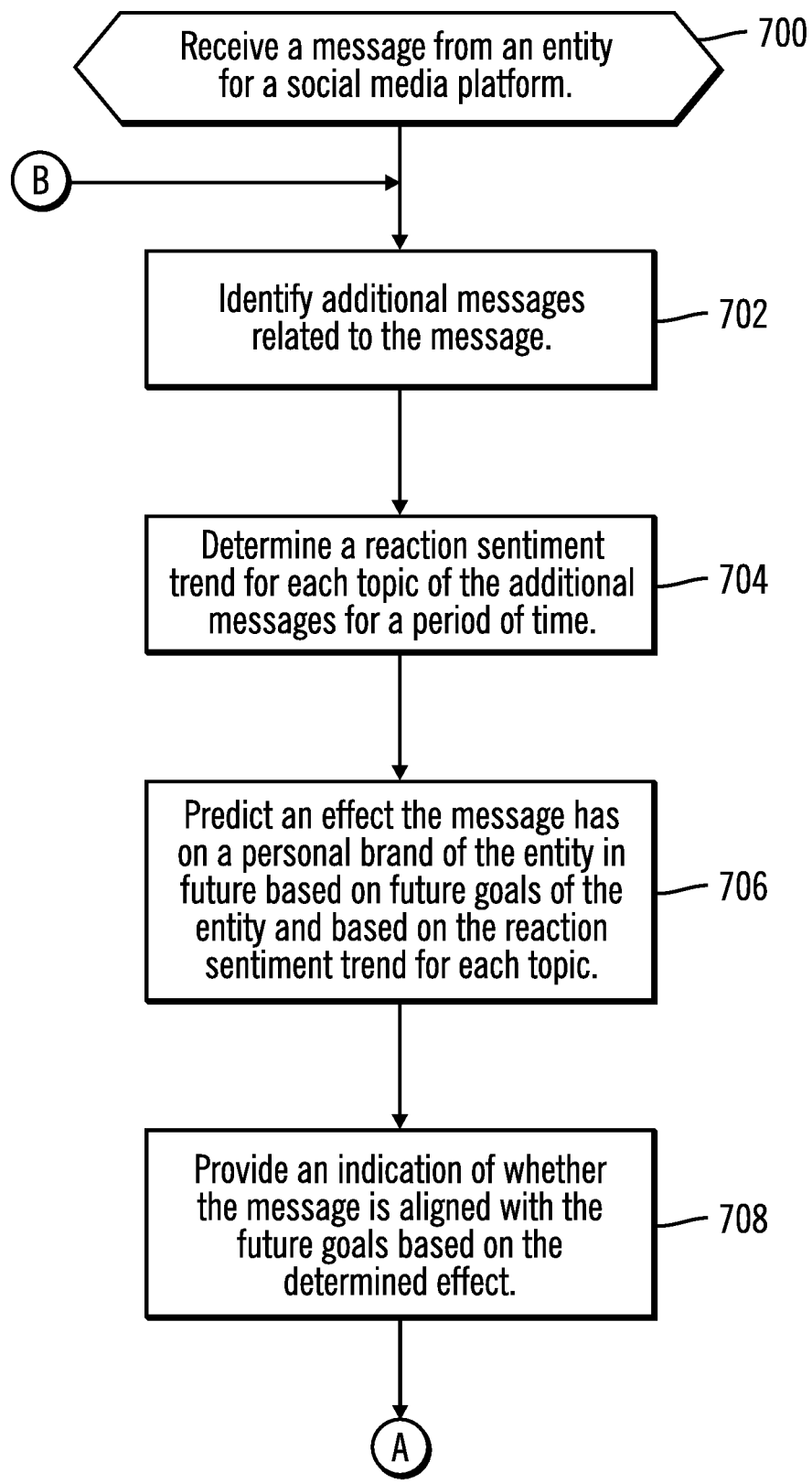
FIGS. 7A and 7B illustrate, in a flow chart, operations for modifying a personal brand in accordance with certain embodiments.
Figure 7B:
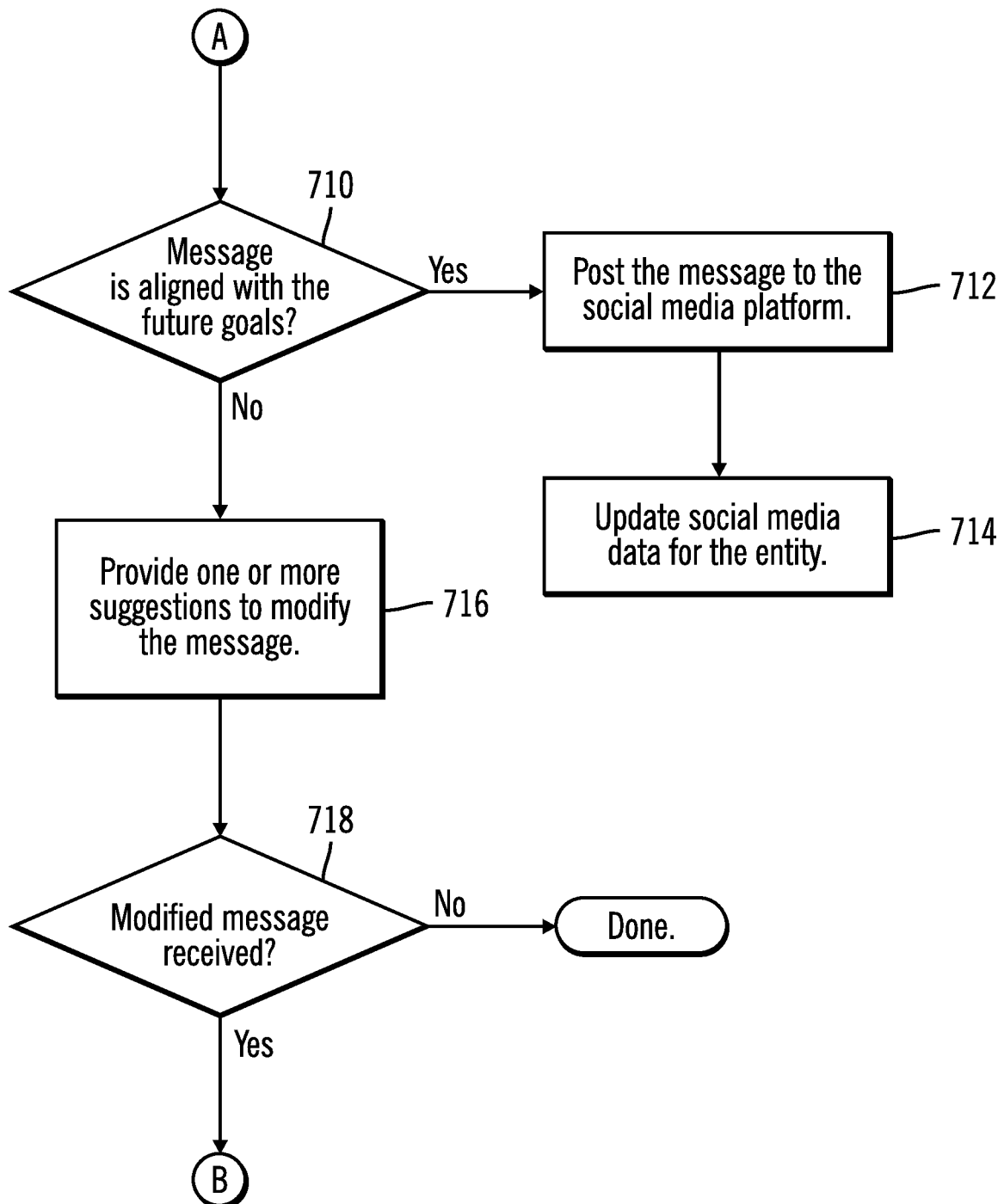

FIGS. 7A and 7B illustrate, in a flow chart, operations for modifying a personal brand in accordance with certain embodiments. Control begins at block 700 with the brand effect analyzer 130 receiving a message from an entity for a social media platform.

In block 702, the brand effect analyzer 130 identifies additional messages related to the message. In block 704, the brand effect analyzer 130 determines a reaction sentiment trend for each topic of the additional messages for a period of time. In block 706, the brand effect analyzer 130 predicts an effect the message has on a personal brand of the entity in future based on future goals of the entity and based on the reaction sentiment trend for each topic. In block 708, the brand effect analyzer 130 provides an indication of whether the message is aligned with the future goals based on the predicted effect.

From block 708 (FIG. 7A), processing continues to block 710 (FIG. 7B). In block 710, the brand effect analyzer 130 determines whether the message is aligned with future goals of the entity. If so, processing continues to block 712, otherwise, processing continues to block 716.

In block 712, the brand effect analyzer 130 posts the message without changes to the social media platform. In block 714, the brand effect analyzer 130 updates the social media data for the entity.

In block 716, the brand effect analyzer 130 provides one or more suggestions to modify the message. In block 718, the brand effect analyzer 130 determines whether a modified message has been received. If so, processing loops back to block 702, otherwise processing continues to block 720. In block 720, the brand effect analyzer 130 is done with processing of the message received in block 700.

Thus, in response to the message being aligned with the future goals, the message is posted to the social media platform; and, in response to the message not being aligned with the future goals, one or more suggestions to modify the message are provided.

Embodiments advantageously analyze a message before it is posted to a social media platform. If it is beneficial to an entity, the message is posted to the social media platform. If it is not beneficial to the entity, then the entity is given the option to change the message. Then, the message is analyzed again.

Thus, embodiments evaluate the effect of the entity's posting on the entity's own social media footprint. Embodiments are directed to determining an effect on the entity's online image of a potential post.

Unlike an agent or a public relations firm that fixes a problem after a message is issued, embodiments provide an indication of the effect of a message before it is posted, thus, avoiding problems of posting messages that are not aligned with future goals.

Figure 8:
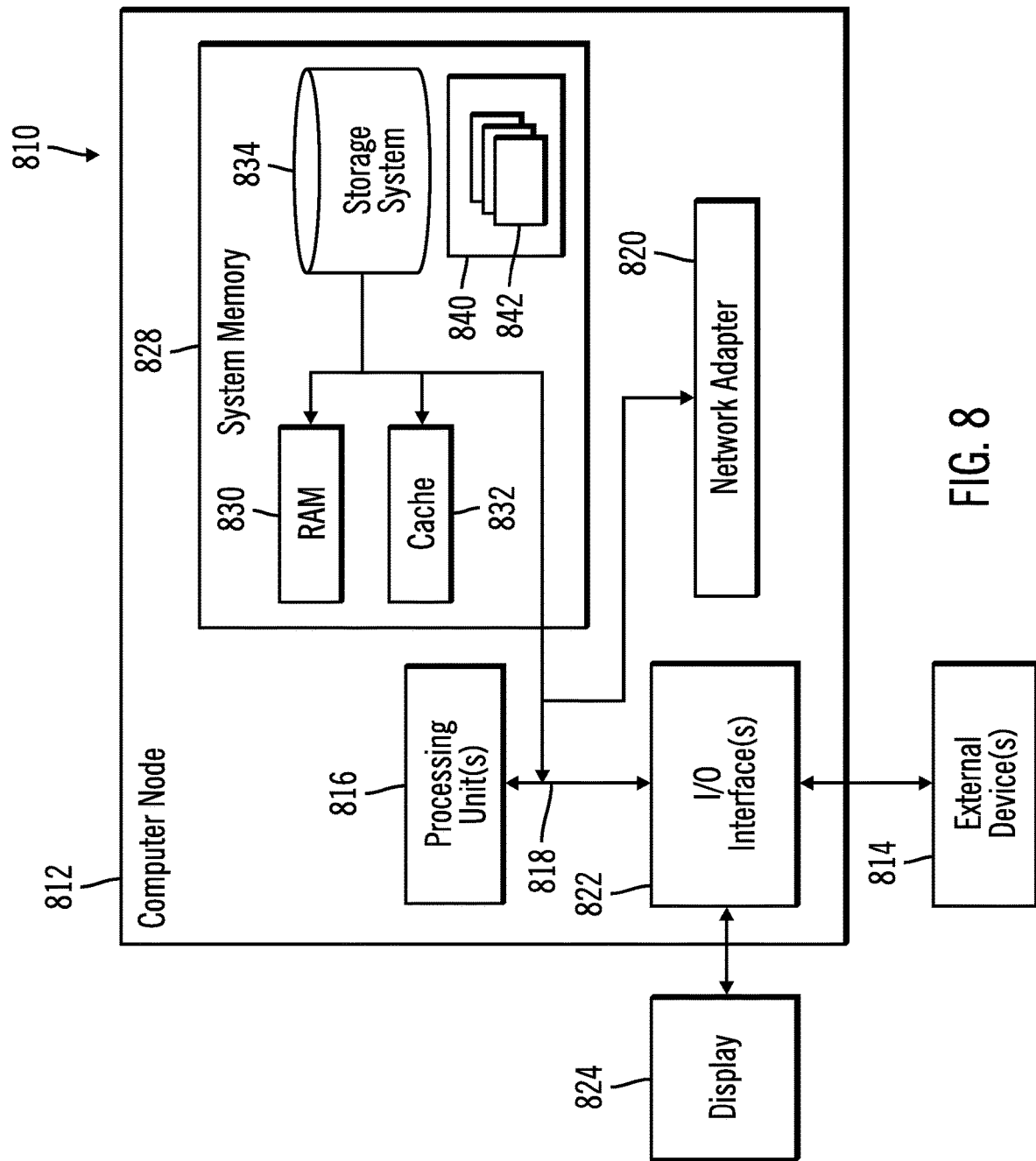
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822.

Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the brand profile generator 120 and the brand effect analyzer 130 have the architecture of computer node 1012. In certain embodiments, the brand profile generator 120 and the brand effect analyzer 130 are part of a cloud infrastructure. In certain alternative embodiments, the brand profile generator 120 and the brand effect analyzer 130 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
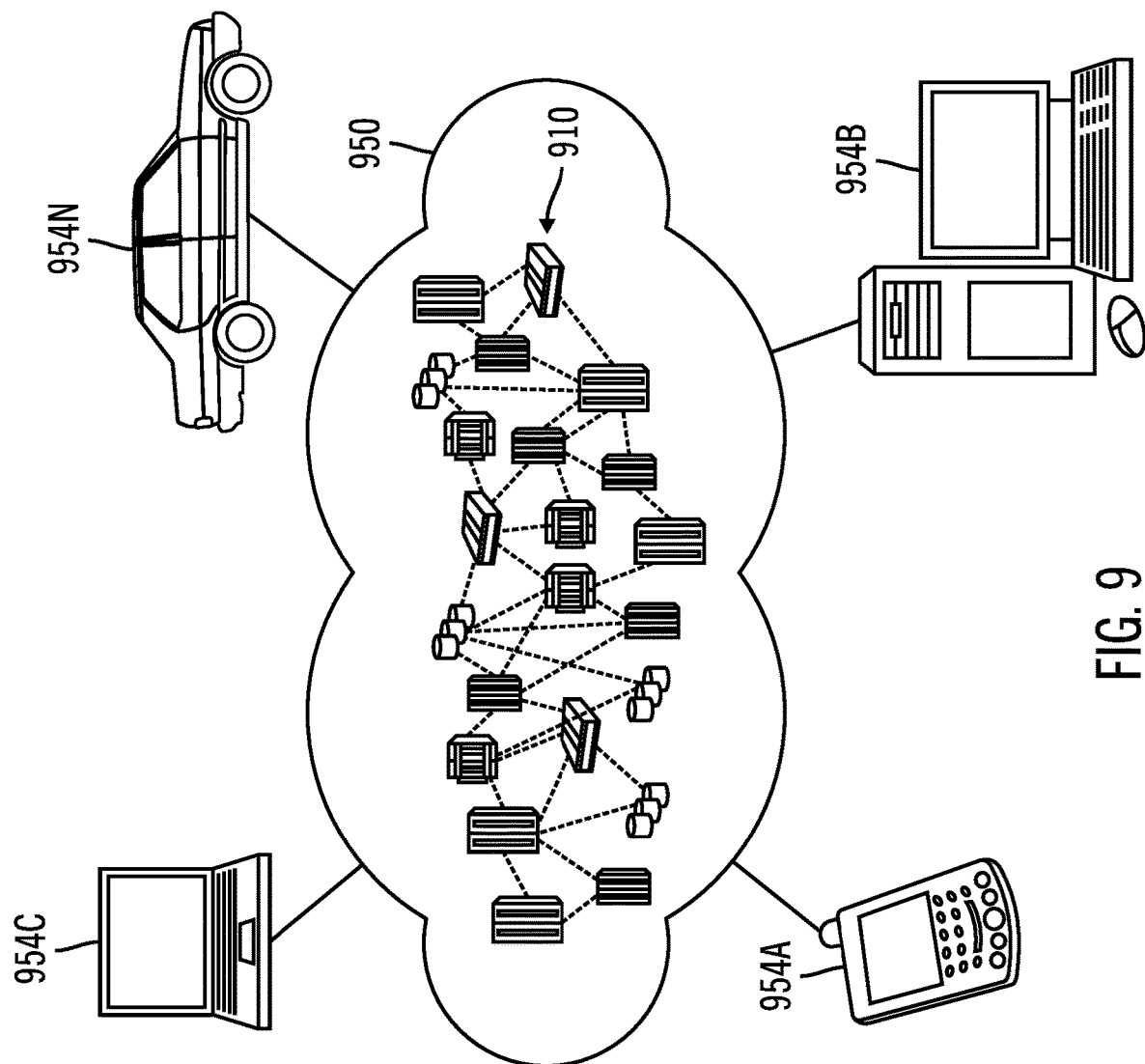
FIG. 9 illustrates a cloud computing environment in accordance with certain embodiments.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
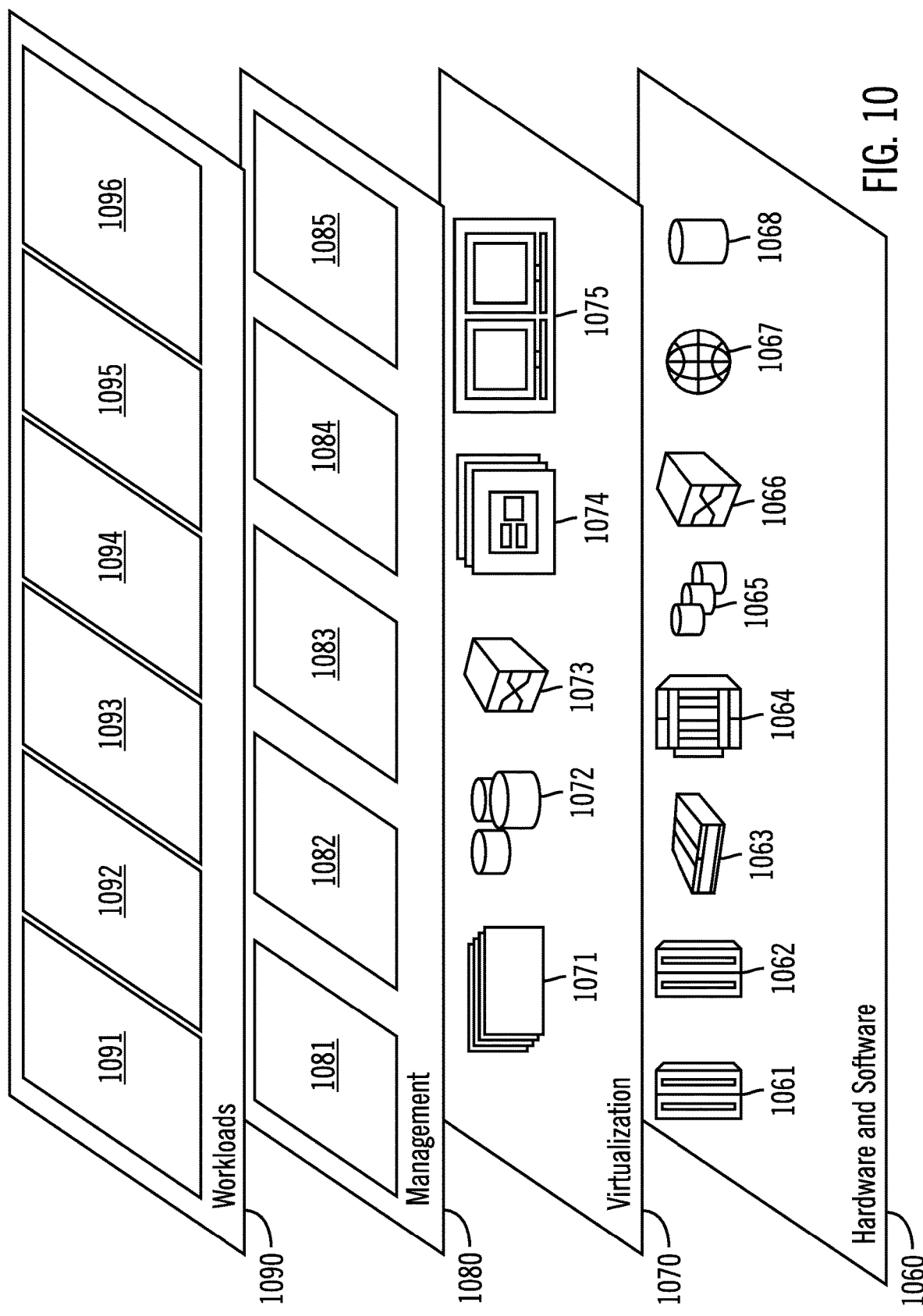
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072;

virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and determining an effect of a message on a personal brand based on future goals 1096.

Thus, in certain embodiments, software or a program, implementing determining an effect of a message on a personal brand based on future goals in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform operations for:
    generating, by a brand effect analyzer, training data from a brand profile, one or more social media profiles, one or more future goals, social media data, traditional media data, and entity preferences of an entity;
    performing, by the brand effect analyzer, machine learning using the training data to output a model;
    receiving, by the brand effect analyzer, a message from the entity for a social media platform;
    identifying, by the brand effect analyzer, additional messages related to the message;
    determining, by the brand effect analyzer, a reaction sentiment trend for each topic of the additional messages for a period of time;
    determining, by the brand effect analyzer, an indication of whether the message contradicts previous messages made by the entity;
    predicting, by the brand effect analyzer, using the model, an effect the message has on a personal brand of the entity in future based on future goals of the entity and based on the reaction sentiment trend for each topic by:
        comparing, by the brand effect analyzer, the message to previously expressed statements that the entity has made; and
        for another entity having similar future goals, determining, by the brand effect analyzer, an effect that one or more other messages of the another entity had, wherein the one or more other messages have a similar type of content as the message;
    providing, by the brand effect analyzer, an indication of whether the message is aligned with the future goals based on the predicted effect and based on the indication of whether the message contradicts the previous messages;
    in response to the message being aligned with the future goals, posting, by the brand effect analyzer, the message to the social media platform;
    in response to the message not being aligned with the future goals,
        providing, by the brand effect analyzer, one or more suggestions to modify the message; and
        in response to receiving a modified message with at least one of the one or more suggestions,
            determining, by the brand effect analyzer, that the modified message is aligned with the future goals based on a new predicted effect; and
            posting, by the brand effect analyzer, the modified message to the social media platform;
    tuning, by the brand effect analyzer, the model based on heuristics and configuration settings that determine how much each event impacts the model; and
    providing, by the brand effect analyzer, suggested changes to the training data based on an effect of the training data on the model.

2. The computer program product of claim 1, wherein the future goals comprise any of personal goals, professional goals, particular positions to be kept consistent, volatile topics to avoid, and opinions to attract favorable attention.

3. The computer program product of claim 1, wherein the program code is executable by the at least one processor to perform operations for:
    extracting, by the brand effect analyzer, one or more topics from the message; and
    determining, by the brand effect analyzer, any of a sentiment, an opinion, and a tone about the one or more topics in the message.

4. The computer program product of claim 3, wherein the program code is executable by the at least one processor to perform operations for:
    identifying, by the brand effect analyzer, similar messages to the message; and
    determining, by the brand effect analyzer, reactions to the similar messages based on comments submitted about the similar messages.

5. The computer program product of claim 1, wherein a Software as a Service (SaaS) is configured to perform the operations of the computer program product.

6. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
    generating, by a brand effect analyzer, training data from a brand profile, one or more social media profiles, one or more future goals, social media data, traditional media data, and entity preferences of an entity;
    performing, by the brand effect analyzer, machine learning using the training data to output a model;
    receiving, by the brand effect analyzer, a message from the entity for a social media platform;
    identifying, by the brand effect analyzer, additional messages related to the message;

determining, by the brand effect analyzer, a reaction sentiment trend for each topic of the additional messages for a period of time;

determining, by the brand effect analyzer, an indication of whether the message contradicts previous messages made by the entity;

predicting, by the brand effect analyzer, using the model, an effect the message has on a personal brand of the entity in future based on future goals of the entity and based on the reaction sentiment trend for each topic by:

comparing, by the brand effect analyzer, the message to previously expressed statements that the entity has made; and for another entity having similar future goals, determining, by the brand effect analyzer, an effect that one or more other messages of the another entity had, wherein the one or more other messages have a similar type of content as the message;

providing, by the brand effect analyzer, an indication of whether the message is aligned with the future goals based on the predicted effect and based on the indication of whether the message contradicts the previous messages;

in response to the message being aligned with the future goals, posting, by the brand effect analyzer, the message to the social media platform;

in response to the message not being aligned with the future goals, providing, by the brand effect analyzer, one or more suggestions to modify the message; and in response to receiving a modified message with at least one of the one or more suggestions, determining, by the brand effect analyzer, that the modified message is aligned with the future goals based on a new predicted effect; and posting, by the brand effect analyzer, the modified message to the social media platform;

tuning, by the brand effect analyzer, the model based on heuristics and configuration settings that determine how much each event impacts the model; and providing, by the brand effect analyzer, suggested changes to the training data based on an effect of the training data on the model.

7. The computer system of claim 6, wherein the future goals comprise any of personal goals, professional goals, particular positions to be kept consistent, volatile topics to avoid, and opinions to attract favorable attention.

8. The computer system of claim 6, wherein the operations further comprise:

extracting, by the brand effect analyzer, one or more topics from the message; and determining, by the brand effect analyzer, any of a sentiment, an opinion, and a tone about the one or more topics in the message.

9. The computer system of claim 8, wherein the operations further comprise:

identifying, by the brand effect analyzer, similar messages to the message; and determining, by the brand effect analyzer, reactions to the similar messages based on comments submitted about the similar messages.

10. The computer system of claim 6, wherein a Software as a Service (SaaS) is configured to perform the operations of the computer system.

\* \* \* \* \*